Figure 1:
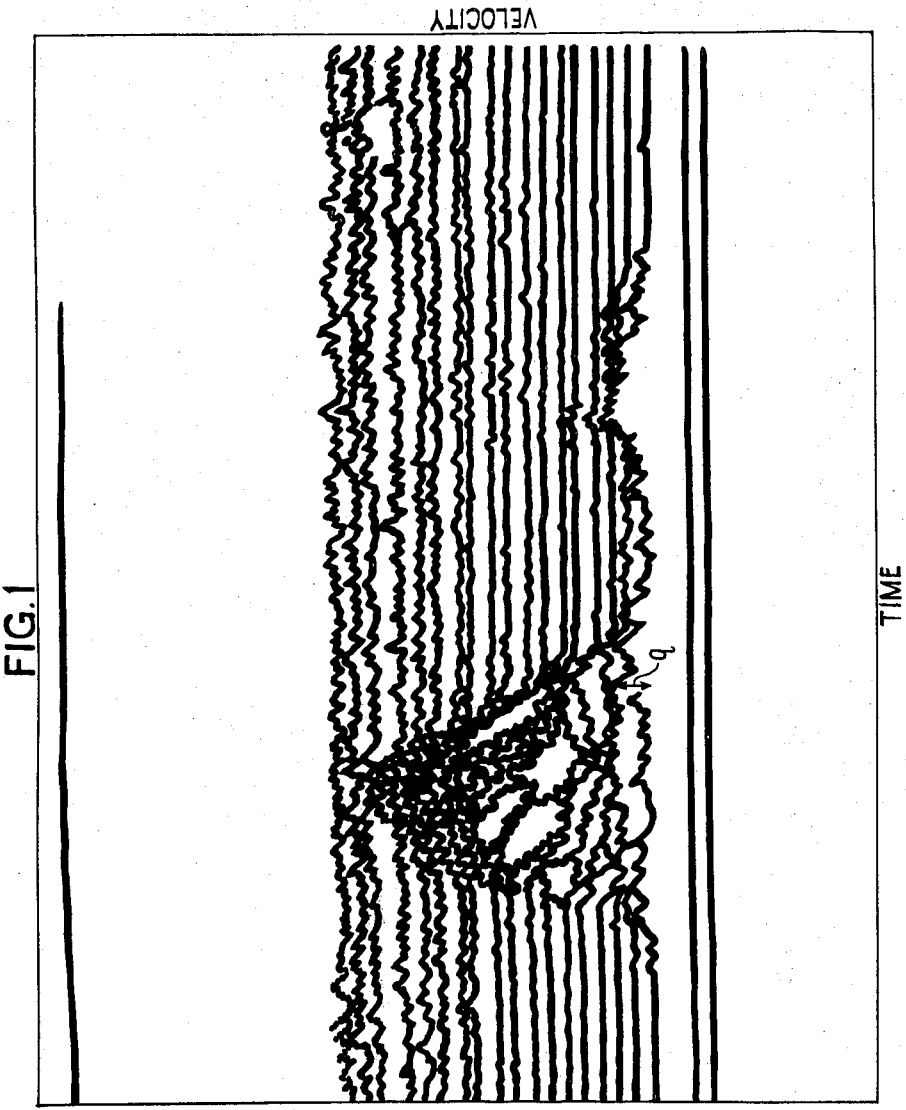

United States Patent
Groves et al.

[11] 3,922,911
[45] Dec. 2, 1975

[54] APPARATUS AND METHOD OF DETERMINING FLOW

[75] Inventors: Henry William Groves, London; John Yarnell, St. Albans, both of England

[73] Assignee: Hawker Siddeley Dynamics Limited, England

[22] Filed: Nov. 27, 1972

[21] Appl. No.: 309,749

[30] Foreign Application Priority Data
Dec. 9, 1971  United Kingdom............... 57168/71
Feb. 10, 1972  United Kingdom................ 6313/72
Apr. 28, 1972  United Kingdom............... 19820/72

[52] U.S. Cl............................ 73/194 A; 128/2.05 F
[51] Int. Cl.[2]......................................... G01F 1/66
[58] Field of Search............... 73/194 A; 128/2.05 F; 324/77 CS

[56] References Cited
UNITED STATES PATENTS
2,535,043  12/1960  Cook........................... 324/77 CS X
3,675,192  7/1972  Fahrbach........................... 73/194 A
3,710,792  1/1973  Light................................. 73/194 A OTHER PUBLICATIONS
Baker, "Pulsed Ultrasonic Doppler Blood-Flow Sensing," IEEE Transactions on Sonics and Ultrasonics, July 1970, pp. 170–185.

Primary Examiner—Charles A. Ruehl
Attorney, Agent, or Firm—Rose & Edell

[57] ABSTRACT

In determination of the characteristics of fluid flow in a conduit, such as blood flow in a blood vessel, the signal information received from a Doppler flow-meter, in the form of a multiplicity of different frequencies simultaneously present, is filtered to give the different frequency signals on separate parallel channels and then the channels are cyclically sampled in sequence. The signal samples so obtained appear in ordered series on a common signal line and may be used to generate a C.R.T. visual display in which each frequency forms an individual trace the consecutive traces being separated from one another by small increments in the Y-axis direction of the display. The different frequency signals are also mutually time separated by comparatively small increments in the X-axis direction, thereby giving a pictorial, apparently three-dimensional, display pattern looking rather like a carpet with humps in it.

17 Claims, 12 Drawing Figures

APPARATUS AND METHOD OF DETERMINING FLOW

This invention relates to a method of and apparatus for determining the flow characteristics of a fluid. In particular, the invention is concerned with a technique whereby signals representative of a flow in a duct are presented in a form which makes analysis readily possible.

More specifically, it is an object of the invention to achieve a method and apparatus giving a visual display of the instantaneously variable conditions of flow within a duct.

According to the present invention, there is provided a method of examining the characteristics of fluid flow in a conduit, using a Doppler flow-meter to obtain information in the form of a multiplicity of simultaneous high frequency signals each of a different frequency, wherein the signals of different frequency, after separation by filtering, are repeatedly samples in sequence in a cyclical manner and the discrete signal samples are applied, in the order in time in which they are obtained, to a common signal channel for further processing and/or display.

Advantageously, the signals of the common channel are employed to create a visual display, e.g. on a long-persistence cathode ray oscilloscope tube, in which the different frequencies appear simultaneously as a band of different nominally parallel traces separated form one another in the direction of one axis of the display and placed in the band in the order of their sampling, the other axis representing time, and all the traces in the band being mutually time-shifted in such manner that every succeeding trace across the band has an equal time shift in the same direction from the trace immediately preceding it, whereby a pictorial and apparently three-dimensional carpet-like display pattern is developed.

The invention further provides apparatus for carrying this method into effect, comprising a clock-controlled multiplexer receiving the filtered incoming signals in parallel and sampling them in sequence, the signal samples being applied in series in sampling order to a common multiplexer output channel.

Figure 2:
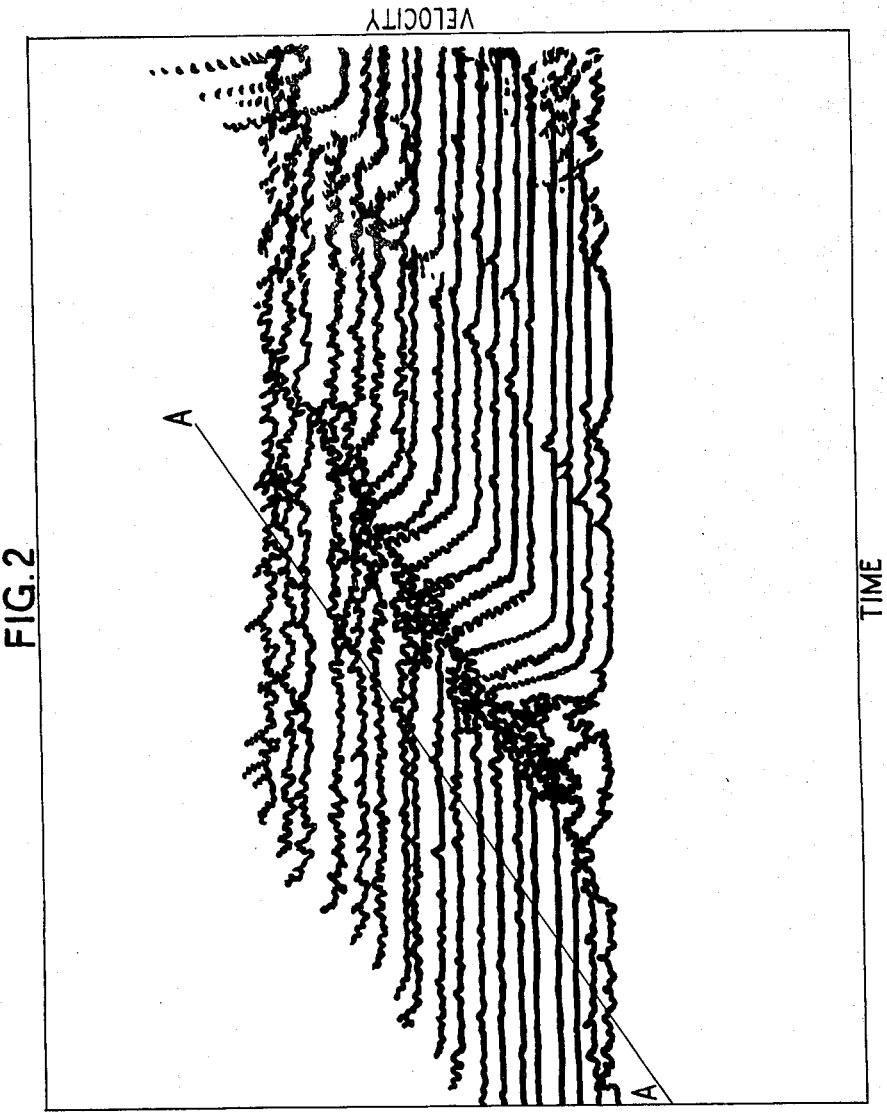
Figure 3:
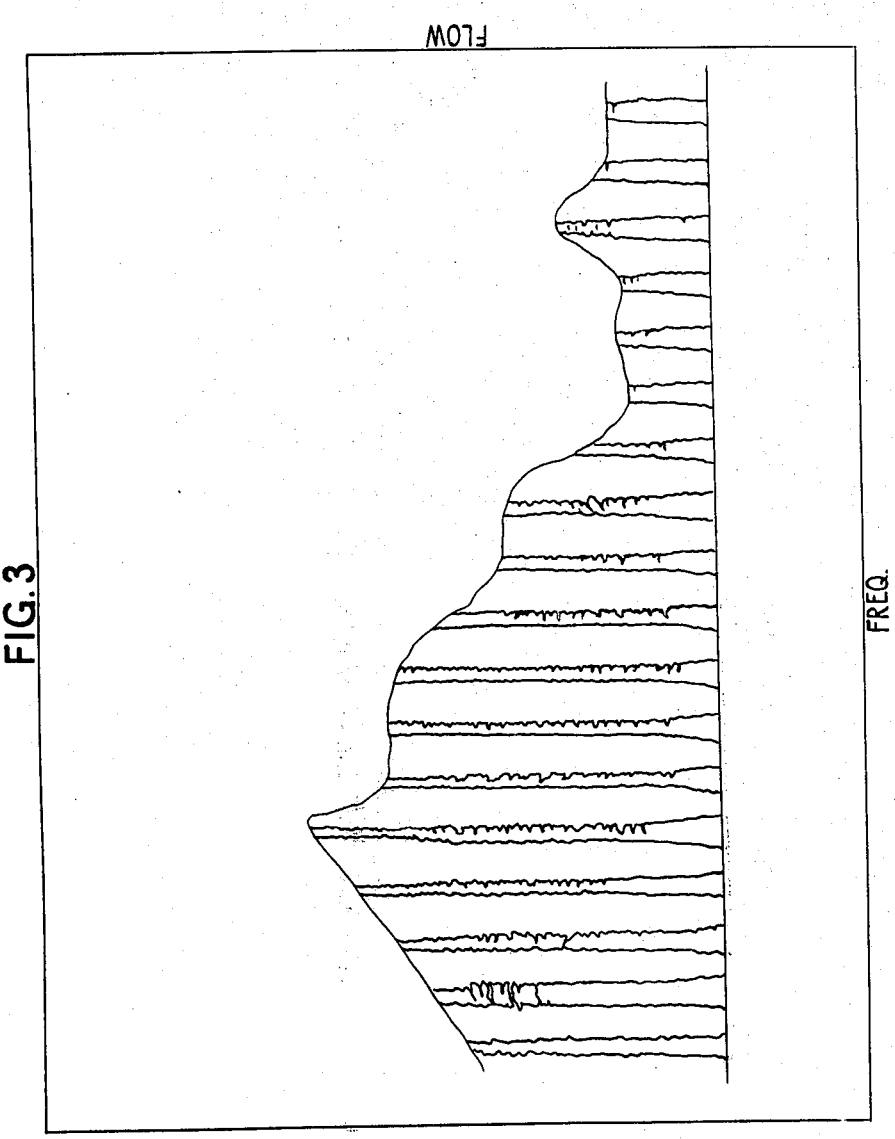
Figure 4:
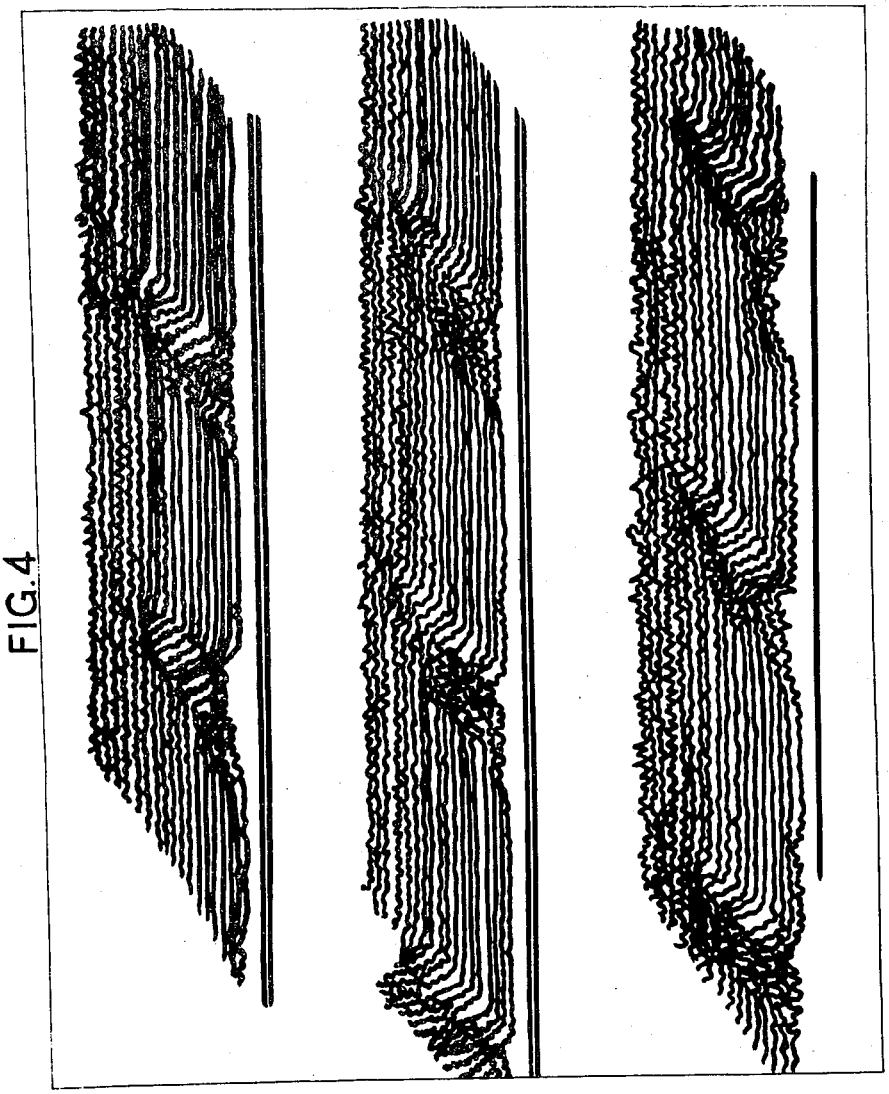
Figure 5:
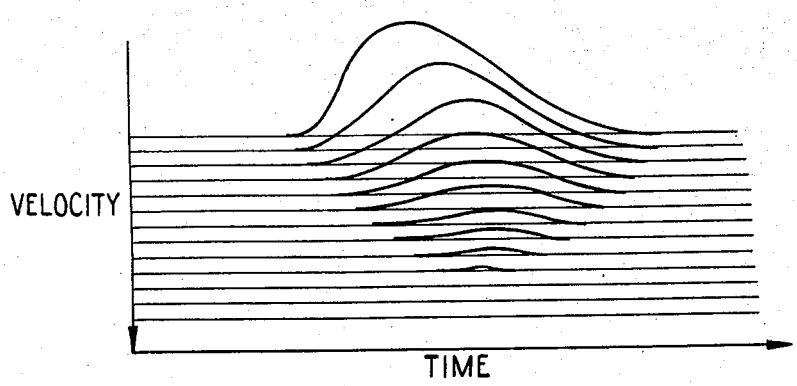
Figure 6:
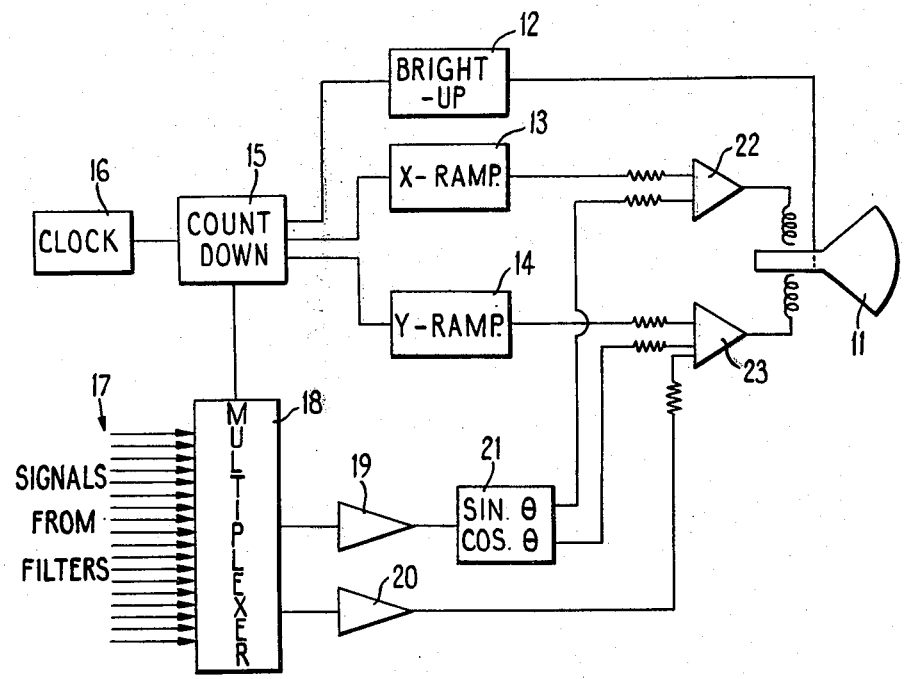
Figure 7:
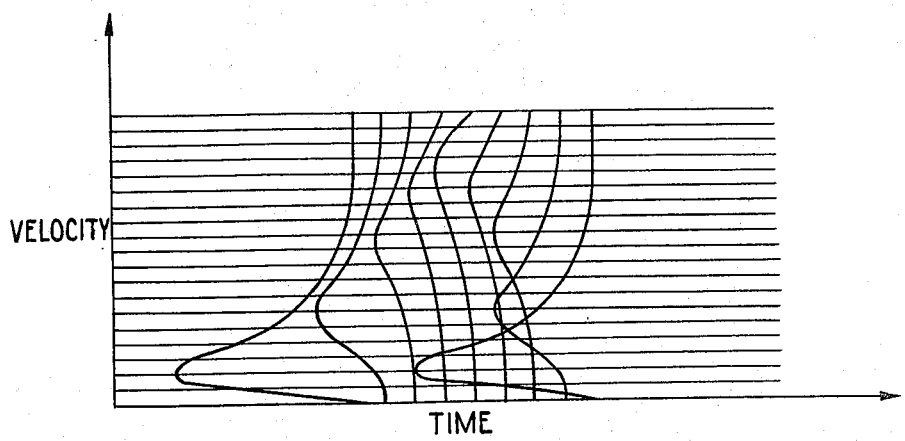
Figure 8:
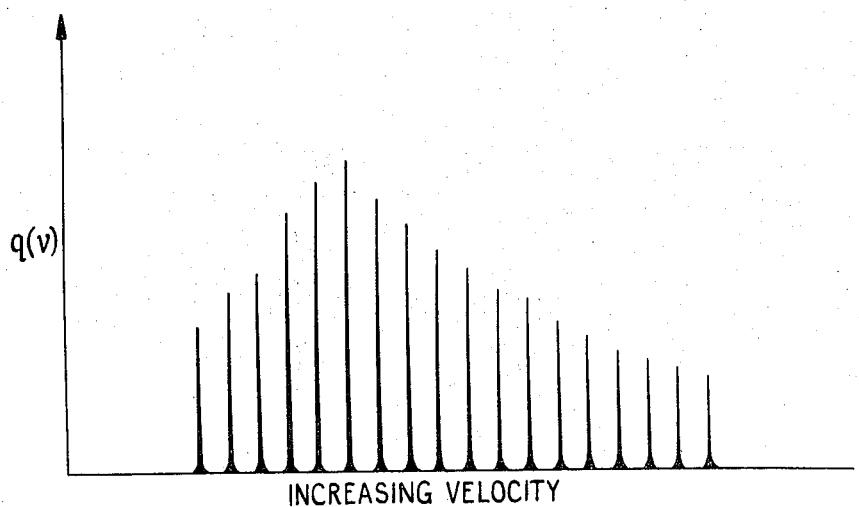
Figure 9:
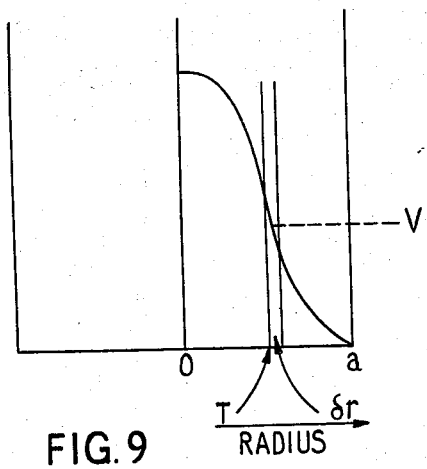
Figure 10:
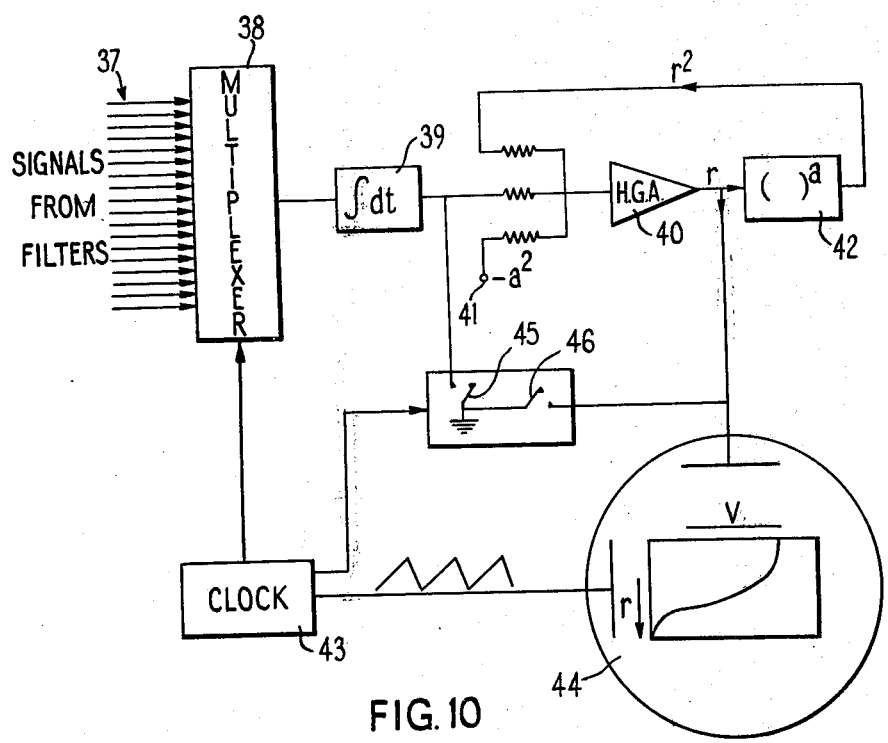
Figure 11:
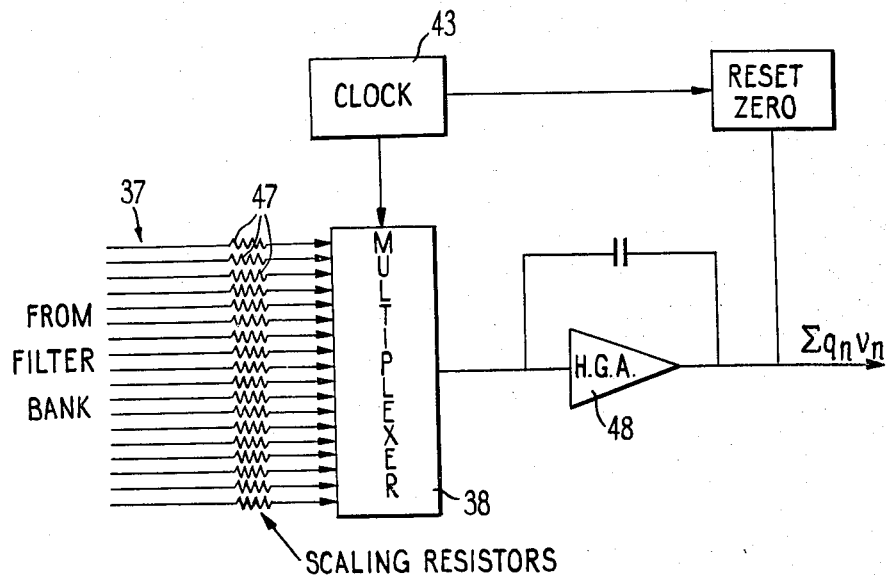
Figure 12:
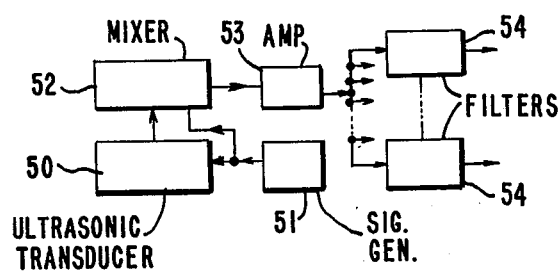

To give a better understanding of the nature of the invention, techniques in accordance therewith will now be described, by way of example, as applied to the measurement of blood flow by a transcutaneous Doppler flow-meter. Reference will be had to the accompanying drawings, in which:

FIG. 1 shows a long-persistence CRT display of multiple frequency traces representing a blood pulse, without time separation of the traces, FIG. 2 shows a display with time separation, FIG. 3 is a display of flow versus frequency, FIG. 4 shows the display of FIG. 2 repeated for a sequence of blood pulses, FIG. 5 is a diagrammatic plot of velocity against time for a multiplicity of frequency channels with time separation, FIG. 6 is a block diagram of an apparatus for producing a display like the diagram of FIG. 5, FIG. 7 is a diagram of another form of display, FIG. 8 is a diagram of a further display, FIG. 9 is a diagram useful in understanding the theory of operation of the apparatus of FIG. 10, FIG. 10 is a block diagram of an apparatus for producing yet another form of display, FIG. 11 shows a modification of the apparatus of FIG. 10, and FIG. 12 is a block diagram of a Doppler flow-meter suitable for supplying the signal input to the apparatuses of FIGS. 6, 10 and 11.

In principle, a Doppler flow-meter comprises a transmitter and receiver of high frequency sound waves known as ultrasound. The beam of ultrasound is directed toward the moving media and the sound is reflected back towards the receiver at a speed greater or smaller than the transmitted speed, according to the velocity of the moving media and its direction relative to the transmitted beam.

A more detailed description of such a flow-meter and its use is given in U.K. Pat. application No. 11825/69. However, the information made available by this prior technique regarding the instantaneous velocity of any particle within a flow duct, is shown as a record in which styli simultaneously draw graphically, on axes representing input signal frequency against real time, a diagram which is varied in density from black to white in accordance with the variation of the signals received for each of the number of styli, each stylus recording signals of a discrete frequency for each signal pass. The resulting record is impossible to analyze in detail because an "average" result is produced, even from a single pass.

The present technique overcomes the difficulty of analyzing resulting information diagrams by presenting a pictorial display in which the simultaneous but separate signals resulting from a signal sweep of ultrasound, including a multiplicity of discrete frequencies, are shown as substantially simultaneous but separate traces on a long-persistence oscillograph screen, being spaced apart in distance on both the real time and frequency axes to give an apparent three-dimensional effect. The manner of obtaining these separate frequency signals has already been made known in U.K. Pat. application No. 11825/69 and is therefore not discussed here. The further processing of the signals to achieve apparent three-dimensional effect is by selective filtering and time separation of each frequency channel. The effect achieved will be better understood by reference to the drawings.

FIG. 1 represents a photographic record taken from the long-persistence screen of an oscilloscope but without time separation. It will be seen that at least fourteen channels, each representing signals of a different given frequency, are combined to formulate the resulting diagram. In each channel the vertical height of the trace, i.e. the distance $q$, represents the instantaneous fluid velocity, the flow rate being a function of the instantaneous fluid velocity and the flow duct area.

Interpretation and analysis of this diagram is made more readily possible by separating each individual signal channel in a time sense. In FIG. 2 time separation has been effected and a line AA drawn at approximately 45° to the horizontal base line meets each signal trace at a common point in real time. The resulting visual effect is to produce in apparent three-dimensional form a diagram representing the simultaneous flow conditions and range of velocities which exist within the duct. From this diagram it will be seen that discrimination between separate signal traces is readily possible thereby also making possible the detection of any abnormalities in the flow conditions.

In FIG. 3 is shown a record of a single pass of a multiplicity of signals, each of a discrete frequency, the vertical height representing the flow (quantity) at each frequency (velocity). In this figure the real time axis is in a direction normal to the plane of the paper and the frequency is lowest at the left of the diagram.

While single pass records have so far been discussed the method may be extended to include multi-pass diagrams, as in FIG. 4, which is a repetitive form of FIG. 2. FIG. 3 may be repeated to give an averaged result over a number of passes.

While the technique according to the invention has so far been illustrated with results taken from a cathode ray tube display, the signals may be displayed by other forms of electro-optical device and may be used in a computer.

There will now be described various methods and means of displaying fluid flow information of the form
$$z = f(x, y)$$
In particular, in the measure of blood flow by means of ultrasonic Doppler measurement it is possible to derive the function
$$dQ = q(V,t)dv$$
where $dQ$ is the quantity of blood in some part of a blood vessel which has a velocity lying in the range $V$, $V + dV$ at time $t$. (See L.H. Light; Nature, London, 224, pp 1119 – 1121).

In the case mentioned, signals proportional to (dQ/dV) are derived as bandwidth limited noise in each of n channels, each at a frequency $f$ and of bandwidth $df$, so that in each channel we have a measure of the quantity,
$$(dp/df = q(f,t)$$
where $p$ is a measurement such as noise power, or a rectified noise signal.

In the more familiar form
$$z = f(x,y)$$
we recognize surface of height $z$ plotted over the $x$, $y$ plane. Each value of $y$ may be associated with a chosen value of $f$, and $x$ may be associated with $t$. The following describes various means of displaying this information.

The information in the case of the blood flow measuring machine is available as continuous functions of time in a number of velocity channels, i.e.
$$q_n = q(V_n, t) \qquad (1)$$
where $V_n$ is the velocity associated with the nth channel.

In displaying this information on the C.R.T. we associate one trace with each value of $n$, and display these traces with small increments in vertical separation between them. We scan all signals $q_n$ in a brief interval, at a time $t$, and display the information in its simplest form as
$$y = k_1 V_n + q(V_n,t) \qquad (2)$$
$$x = k_2 t$$
This produces, as a representation of a pulse of blood flow, the visual effect of a hump in a carpet seen at an angle, as in FIG. 5. Here $k_1$ is negative, to avoid the overlaying of the high velocity trace with large amplitude signals from the low velocity traces.

A block diagram of equipment to produce this result is shown in FIG. 6 where the setting $\Theta = 0$ corresponds to the display described.

A cathode ray oscilloscope tube 11 has its bright-up control 12 and X-ramp and Y-ramp drives 13, 14 pulsed by a counter 15 receiving count pulses from a clock 16. The signals of different frequencies to be displayed arrive from the filters on lines 17 and are applied in parallel to a multiplexer 18 that delivers them one at a time in sequence to an amplifier 19. Amplifier 19 feeds a sine/cosine resolver 21, and the resolver input times sin $\Theta$ (in this case zero) is summed with the X-ramp at deflection amplifier 22 while the resolver input times cos $\Theta$ (in this case unity) is summed with the Y-ramp at deflection amplifier 23.

It will be seen that the complete trace is made up of many individual points, since we sample by means of the multiplexer 18, so that each trace is added to at intervals of Nc seconds, where N is the total number of channels and $c$ the inverse of the multiplexer frequency. In the absence of a signal on any channel 17, this complete trace is a rectangular (approximately) array of spots on the C.R.T., representing the intersection of warp and weave in the carpet material.

The effects can be enhanced by brightening the spot at regular time intervals, and also at chosen velocity intervals $q$ every 0.1 seconds and for every 5th value of $n$. In the absence of signals, we then see a checked weave, which is deformed in a visually significant way when signals appear on lines 17 to deflect the traces from straight lines.

If we change the C.R.T. deflection scheme to
$$y = k_1 V_n \quad 3)$$
$$x = k_2 t - p(V_n,t) \qquad (3)$$
the effect is that of a hump in the carpet seen from a different angle, as in FIG. 7. If FIG. 5 is described as a view from the south, then FIG. 7 is a view from the east. Clearly by adopting an intermediate display, defined by
$$y = k_1 V_n + q(V_n,t) \cos\Theta 4)$$
$$x = k_2 t - q(V_n,t) \sin\Theta \qquad (4)$$
we can control the apparent direction of view by varying $\Theta$. FIG. 6 indicates the use of sine-cosine resolver potentiometer 21 for this purpose.

If we are content with a finite number of directions of view, we can replace the resolver potentiometer by switchable resistors controlling the gains of the signals proportional to $q(V_n,t)$ as applied to the two deflection amplifiers 22, 23.

An even simpler scheme which produces something of the same effect as described above, is to employ
$$y = k_1 V_n + q(V_n,t) \quad 5)$$
$$x = k_2 t + k_3 V_n \qquad (5)$$
Visually, this has the effect of shearing the surface, giving a result corresponding to a view of the hump from above and to one side. As $k_3$ is swung from positive to negative the flanks of the hump appear as seen from one side, then the other.

An improvement on any of these displays is brought about by suppressing, to some degree at least, the C.R.T. spot brightness when the signal being recorded is low. This leaves the humps in the surface sharply contrasted with the undeformed carpet. The level of signal below which this suppression is imposed is chosen so that noise on the trace is obliterated.

Alternatively, or additionally, the contrast between undeformed carpet and hump may be enhanced by suppressing all signals $q(V_n,t)$ when the amplitude is below some chosen level. In this case the effect is to flatten the carpet where no appreciable hump exists, thus ignoring noise when unaccompanied by an appreciable signal.

A further variation on this scheme recognizes the nature of blood flow and its specially significant features. The equation of the surface
$$q = q(V,t)$$
can be written
$$V = V(t,q)$$
If we consider the progressive generation of first, low velocities, then higher velocities, during systole, we recognize that the curve
$$V^1(t) = V(t,0) \quad (6)$$
has a boundary where $q(V,t)$ is just rising from $q = 0$. The quantity $dV^1/dt$ near the beginning of a blood pulse is related to the tone of the heart muscle, and is of clinical interest. The slope of the curve can be sharply delineated by brightening the spot wherever $q$ is positive yet close to zero.

A measure of the quantity $dV^1/dt$ can be quickly obtained by altering the apparent angle of view of the carpet until the initial slope of the curve
$$V^1 = V(t,0)$$
appears to be vertical on the screen. For example in the display characterized by equations (5) the brightened outline would occur where
$$y = k_1 V^1$$
$$x = k_2 t + k_3 V^1$$
whence
$$\frac{dy}{dt} = k_1 \frac{dV^1}{dt}$$

$$\frac{dx}{dt} = k_2 + k_3 \frac{dV^1}{dt}$$

Clearly $dy/dx$ is infinite when $$\frac{dV^1}{dt} = -\frac{k_2}{k_3}$$

i.e. by adjusting $k_2/k_3$ suitably we can infer $dV^1/dt$, and relate it to heart muscle tone.

Note that this cannot be done with the other displays described above.

In association with any of the above displays, where time is basically the $x$ - displacement on the C.R.T., one or more channels of additional information may be fed into the multiplexer, e.g. event markers to represent the application of stimuli, or an analogue electro-cardiograph signal. Such signals do not pass through the sine/cosine potentiometer 21 or equivalent device, but pass straight to the Y deflection amplifier 23. One such channel is shown at 20 in FIG. 6.

An alternative presentation of the data available as output from Light's method of observing blood-flow is as follows.

The surface $q = q(V_2 t)$ can be regarded at any moment as being sectioned by the plane $t = $ const. In this case we have
$$q = q(V)$$
If we make a C.R.T. display in which
$$y = k_1 q$$
$$x = k_2 V$$
we see, scanned as the multiplexer operates, a representation of $q$ against $v$ — see FIG. 8. Successive scans of the multiplexer show the cross-section changing in the $q,V$ plane, and in particular the way in which velocity first increases, them diminishes, is particularly clearly shown. Moreover, if a photographic plate is exposed to this display throughout at least one complete blood pulse, the integrating property of the emulsion averages $q(v)$ over that period, so that the average signal stands out distinct from the noise.

The equipment employed in Light's method of observing blood-flow lends itself to a quite different form of presentation, called the pseudo-profile. If the velocity across a circular tube is known at any time, it is easy to calculate the quantity
$$q(V,t) = dQ/dV$$

Conversely, given $q$ as a function of $V$ & $t$, if r is the tube radius it is possible to deduce $V = V(r,t)$, assuming:

$V$ is monotonic with $r$ from the wall of the tube: this excludes turbulence.

the tube is circular and the flow symmetrical.

In general, these conditions will not be satisfied. However, a procedure which pretends that they will produces a psuedo-profile, which on a comparative basis may be informative regarding clinical conditions.

The general case is indicated, for a tube of length l, in the equations which relate to FIG. 9. Let $Q(V)$ be the quantity of blood with velocity less than V. From FIG. 9.

$$dQ = -2 \pi r l \, dr$$

$$= -2 \pi r l \frac{dr}{dV} \cdot dV$$

$$\frac{dQ}{dV} = -2 \pi r l \frac{dr}{dV}$$

Now $dQ/dV$ is the quantity $q(V)$ measured in a given channel of the blood-flow measuring device.

$$q(V) = -2 \pi r l \frac{dr}{dv}$$

$$\int q(V) \, dV = -2 \pi r l. \int r \, dr$$

If we put $V = kt$ (i.e. we scan across the channels at a constant rate) we can put
$$k \int q(t) dt = -2 \pi l. \int r \, dr$$
and if we arbitrarily put r = a at the beginning of this process we have
$$k \int q(t) dt = -2 \pi l. \int a^r r \, dr$$
$$= 2 \pi l. (a^2 - r^2) \quad (6)$$

Now, during the scan across channels, sampling $q(t)$ in each channel, we can generate a quantity proportional to the left hand side of the equation. The apparatus shown in FIG. 10 is appropriate for this. The incoming lines from the filters 37 are applied to a multiplexer 38, as before, and are sampled and fed in sequence to an integrator 39 to derive the signal quantity proportional to the left hand side of the equation. This quantity is algebraically summed, at the input of a high gain amplifier 40, with a constant quantity proportional to $-a^2$, from terminal 41, and a feedback quantity. By applying the output signal of the amplifier 40 to a squaring circuit 42 and employing the output of the squaring circuit as the feedback signal to the amplifier input, the equation is balanced, the amplifier output and feedback signals being proportional to the variables $r$ and $r^2$, respectively. We thus have, from the clock 43 driving the multiplexer 38, a time base representing $V$, and from the amplifier 40 a signal representing $r$, and we can therefore display $r$ against $V$ on the tube 44, as indicated.

Two clock driven solid state switches 45, 46 reset the voltages of interest to zero at the beginning of each new scan.

A further use of the information supplied by light's equipment is in displaying or calculating total momentum of blood in the field of "view" of the ultrasonic head. The quantity of blood in each velocity interval, $q_n(V_n t) \, dV$, integrated over all such intervals, is clearly the total amount of blood in the field of view, a constant. A more interesting quantity is perhaps the momentum, which can be derived as shown in FIG. 11.

The separate channels 37 feed the multiplexer 38 through scaling resistors 47, each chosen so that the output voltage signal from the multiplexer is proportioned, not to $q_n$, but to $V_n q_n$. The carpet of information can be displayed as before, but the vertical ordinate is now momentum in each channel, not velocity. Similarly, the scanned outputs from the multiplexer 38 can be applied to the input circuit of an electronic integrator 48, so that during each scan of the mulitplexer the integrator performs the summation, $$\int q_n V_n \, dt \approx k \Delta V \Sigma_n q_n V_n \quad (7)$$

The integrator 48 is reset to zero at the beginning of each scan by the clock 43. Thus at the end of each scan we have available a measure of the total momentum in the field of view, and this signal may be used in any convenient way, e.g. for passing to a computer via an analogue-digital converter, or for single channel display, or for print-out at selected moments.

The measure of momentum so made available may itself be integrated with respect to time during each blood pulse, the integrator being reset, for example, at each R - spike from an electro-cardiograph. This integral may then be displayed as a progressive function of time for simple monitoring of heart function.

There will now be discussed a technique of determining the average blood flow in the aorta.

If one assumes "plug" flow in the fully or partially illuminated curved aorta (zero velocity gradient across it normal to flow) it can be shown that the blood pulse outline obtained on the C.R.T. display is directly proportional to the axial displacement of the blood in the aorta during the particular pulse in question. From experience, these pulses are roughly triangular and using the "half-base x perpendicular height" formula one can adopt the following method of processing the signal.

The multiplexer, shown in FIGS. 6, 10 and 11 as it scans the channels, selects the highest velocity channel in which exists a signal lasting more than, say, 50 m/secs(trimmable). Making this longer than a certain minimum time period ensures that flow is detected and not other effects such as heart movement which are normally very "spikey" and of quite short duration.

On the subsequent pulse the multiplexer selects a channel approximately half-way below that already selected in the previous pulse and the duration of this signal is measured. Any inclusion of other effects here is not particularly serious as they are of relatively short duration compared with the flow pulse.

These two signals are then multiplied together (applying a trimmable correction factor) to give the distance the slug of blood moves down the aorta in one pulse, i.e. cm/sec. $x$ seconds = cm.

This distance signal per pulse is then displayed on a single pen recorder in parallel with the C.R.T. display and we can obtain a permanent record of displacement per pulse on a slowly moving roll of paper for general long term monitoring purposes. Alternatively, the possibility exists of a printer displaying the averaging of, say, the 10 preceding pulses. This displacement signal per pulse is then multiplied by the pulse rate, giving a smoothed average velocity of blood-displacement in the aorta on the single pen recorder in cm/sec.

It is further envisaged that with a knowledge of the aorta cross-section it is possible to obtain the volume displacement, although at the present time it is felt that velocity on its own is likely to be a better parameter for clinical comparative purposes as it gets over the problems of:

a. The COPA unaccounted-for volume flow to the head and arms before we carry out our measurement further down-stream.

b. The large variations in volume flow between men and women and between adults and children.

To provide the signal input to the multiplexer 18 or 38 of FIGS. 6, 10 or 11, a Doppler flow-meter can be employed such as in disclosed in British Pat. specification No. 1,308,451. This is shown in FIG. 12. An ultrasonic transducer 50 receives wave energy from a signal generator 51 and radiates that energy toward the target region that is to be monitored. The transducer 50 also acts as a receiver for radiation reflected to it from the target region, and a mixer 52 has a first input consisting of the received reflected radiation from the transducer 50 and a second input consisting of the transmitted wave signal from the signal generator 51. In the mixer 52, the two input signals are mixed to produce a beat signal output that is fed to a broad band amplifier 53. The output from the amplifier 53 is applied in parallel to a plurality of narrow band pass filters 54 having respective different frequency bands, the filter outputs constituting the input signals 17 or 37 to the apparatuses of FIGS. 6, 10 and 11.

What we claim is:

1. In the determination of flow characteristics of a fluid in a flow path by the Doppler flow sensing technique, which technique derives a plurality of measurement signals of different nominal frequency and shifted in frequency from said nominal frequency as a function of the instantaneous velocity of respective fluid particles in said flow path, a method of processing said signals comprising the steps of:

separating said measurement signals, one from the other, on the basis of nominal frequency;

cyclically obtaining amplitude samples from the separated signals in turn in a predetermined sequence which is repeated at a sufficiently high rate to respond to significant changes in the power level in each such signal;

combining the obtained amplitude samples, in the order obtained, in a common signal channel for further processing; and providing a two-axis graphical display in the form of a plurality of traces, each trace corresponding to a respective measurement signal as reconstructed from successive amplitude samples obtained from that signal, wherein the different traces appear simultaneously in a band of nominally parallel traces extending along one axis representing time, the traces being separated in the band along the other axis of the display and ordered according to the sequence in which their amplitude samples appear, said other axis representing amplitude for each trace individually wherein all of the traces in said band are mutually time-shifted in such manner that each succeeding trace in the band has an equal time shift in the same direction from the immediately preceding trace, whereby a pictorial and illusionary three-dimensional carpet-like display pattern is developed.

2. The method according to claim 1 wherein said two-axis graphical display is presented on a long-persistence cathode ray oscilloscope tube.

3. The method according to claim 2 further comprising the step of periodically brightening the cathode ray at regular intervals of display along both axes.

4. The method according to claim 1 wherein said traces are displayed according to the equations:
$$y = k_1 V_n + q(V_n, t) \text{ and}$$
$$x = k_2 t,$$
wherein $x$ is the position along said one axis and $y$ is the position along said other axis, $k_1$ and $k_2$ are constants, $V_n$ is the instantaneous fluid particle velocity represented by measurement signal $n$, $n$ represents the number of each measurement signal in turn, $t$ represents time, and $q(V_n, t)$ represents a function of $V_n$ and $t$ determined by parameters of the Doppler flow sensing technique.

5. The method according to claim 1 wherein said traces are displayed according to the equations:
$$y = k_1 V_n \text{ and}$$
$$x = k_2 t - q(V_n, t),$$
wherein $x$ is the position along said one axis and $y$ is the position along said other axis, $k_1$ and $k_2$ are constants, $V_n$ is the instantaneous fluid particle velocity represented by measurement signal $n$, $n$ represents the number of each measurement signal in turn, $t$ represents time, and $q(V_n, t)$ represents a function of $V_n$ and $t$ determined by parameters of the Doppler flow sensing technique.

6. The method according to claim 1 wherein said traces are displayed according to the equations:
$$y = k_1 V_n + q(V_n, t) \cos \Theta \text{ and}$$
$$x = k_2 t - q(V_n, t) \sin \Theta,$$
wherein $x$ is the position along said one axis and $y$ is the position along said other axis, $\Theta$, $k_1$ and $k_2$ are constants, $V_n$ is the instantaneous fluid particle velocity represented by measurement signal $n$, $n$ represents the number of each measurement signal in turn, $t$ represents time, and $q(V_n, t)$ represents a function of $V_n$ and $t$ determined by parameters of the Doppler flow sensing technique.

7. The method according to claim 1 wherein said traces are displayed according to the equations:
$$y = k_1 V_n + q(V_n, t) \text{ and}$$
$$x = k_2 t + k_3 V_n$$
wherein $x$ is the position along said one axis and $y$ is the position along said other axis, $k_1$, $k_2$ and $k_3$ are constants, $V_n$ is the instantaneous fluid particle velocity represented by measurement signal $n$, $n$ represents the number of each measurement signal in turn, $t$ represents time, and $q(V_n, t)$ represents a function of $V_n$ and $t$ determined by parameters of the Doppler flow sensing technique.

8. The method according to claim 1, wherein said display is presented on a cathode ray tube, said method further comprising the step of reducing the brightness of the cathode ray when the amplitude sample to be displayed is below a predetermined level.

9. The method according to claim 1 further comprising the step of inhibiting display of amplitude samples for any trace in which the amplitude samples are below a predetermined level.

10. The method according to claim 1 employed to determine blood flow characters in vivo.

11. Apparatus for processing measurement signals obtained by the Doppler flow sensing technique, wherein said measurement signals are of different nominal frequencies from which the signals are shifted as a function of the instantaneous velocity of respective fluid particles in the sensed flow, said apparatus comprising:
a clock pulse source;
automatically re-cycling counter means for counting clock pulses from said source and defining operating cycles of said apparatus;
a multiplexer controlled by said counter means and arranged to receive a plurality of input signals to which individual numbers are assigned and provide as a single output signal the input signal having an assigned number corresponding to the clock pulse count at said counter means; and
means for applying said measurement signals of different nominal frequency to said mulitplexer as said plurality of input signals.

12. The apparatus according to claim 11 further comprising:
two-axis display means having an x-axis amplifier, a y-axis amplifier, a visual display member on which indicia appears as a function of the amplitudes of signals applied to said x-axis and y-axis amplifiers;
a first ramp generator for providing a first ramp waveform signal;
means for summing the output signal from said multiplexer with said first ramp waveform signal to provide a sum signal;
means for applying said sum signal to said y-axis amplifier;
control means for controlling the intensity of indicia on said visual display; and
means for pulsing said control means and said ramp generator means each time the count in said control means reaches a predetermined number.

13. The apparatus according to claim 12 further comprising:
sine-cosine resolver means responsive to signal applied thereto for providing a first output signal of amplitude equal to the input signal amplitude multiplied by the sine of a predetermined angle and a second output signal of amplitude equal to the input signal amplitude multiplied by the cosine of said predetermined angle;
means for applying the output signal from said multiplexer to said sine-cosine resolver means;
means for applying said first output signal from said sine-cosine resolver means to said x-axis amplifier; and
means for applying said second output signal from said sine-cosine rresolver means to said y-axis amplifier.

14. Apparatus for processing measurement signals obtained by the Doppler flow sensing technique, wherein said measurement signals are of different nominal frequencies from which the signals are shifted as a function of the instantaneous velocity of respective fluid particles in the sensed flow, said apparatus comprising:
clocking means for generating a train of pulses defining repetitive sequences of operating cycles of said apparatus;
a multiplexer controlled by said clocking means and arranged to receive a plurality of input signals to which individual members are assigned, each number corresponding to a respective operating cycle defined by said train of pulses, and to provide as a single output signal the input signal having an assigned number corresponding to the current operative cycle defined by said train of pulses; and
means for applying said measurement signals of different nominal frequency to said multiplexer as said plurality of input signals.

15. The apparatus according to claim 14 further comprising:

integrator means for integrating the output signal from said mulitplexer;

a high gain amplifier having input and output terminals;

source means for providing a constant amplitude signal;

a squaring circuit having an input signal connected to the output terminal of said amplifier and having an output terminal;

means for connecting the integrated signal from said integrator means to the input terminal of said amplifier in summing relationship with said constant amplitude signal and a feedback signal from the output terminal of said squaring circuit.

16. The apparatus according to claim 15 further comprising:

two-axis display means having x-axis deflection means, y-axis deflection means, and a visual display member on which indicia appears as a function of the amplitudes of signals applied to said x-axis and y-axis deflection means;

means for connecting the output terminal of said high-grain amplifier to supply input signal to said y-axis amplifier; and means for synchronizing said x-axis deflection means with a signal derived from said clocking means.

17. The apparatus according to claim 14 further comprising:

a plurality of series input resistors connected to pass and correspondingly scale the measurement signals applied to said multiplexer;

resettable integrator means for integrating the output signal from said multiplexer; and means for resetting said integrator upon each of said sequence of operating cycles.

* * * * *